(12) United States Patent
Uchida (10) Patent No.: US 8,792,036 B2
(45) Date of Patent: Jul. 29, 2014

(54) IMAGE SENSOR AND IMAGE CAPTURE APPARATUS

(75) Inventor: Mineo Uchida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 224 days.

(21) Appl. No.: 13/415,467

(22) Filed: Mar. 8, 2012

(65) Prior Publication Data

US 2012/0268619 A1    Oct. 25, 2012

(30) Foreign Application Priority Data

Apr. 21, 2011    (JP) ................................. 2011-095276

(51) Int. Cl.
*H04N 5/217*    (2011.01)
*H04N 3/14*    (2006.01)
*H04N 5/335*    (2011.01)

(52) U.S. Cl.
USPC ............ 348/308; 348/241; 348/300; 348/302

(58) Field of Classification Search
USPC .................................................. 348/241, 308
See application file for complete search history.

(56) References Cited

U.S. PATENT DOCUMENTS

| | | | | |
|---|---|---|---|---|
| 2004/0135910 A1* | 7/2004 | Nam | ............................. | 348/308 |
| 2006/0231732 A1* | 10/2006 | Yan | ............................. | 250/208.1 |
| 2006/0268137 A1* | 11/2006 | Myers | ............................. | 348/294 |
| 2008/0309809 A1* | 12/2008 | Cieslinski | ..................... | 348/308 |
| 2010/0026814 A1* | 2/2010 | Shimoda | ..................... | 348/207.1 |
| 2010/0277623 A1* | 11/2010 | Tejada et al. | .................. | 348/241 |
| 2012/0062772 A1* | 3/2012 | Osawa et al. | ................. | 348/300 |

FOREIGN PATENT DOCUMENTS

JP    2007-174478    7/2007

* cited by examiner

*Primary Examiner* — Sinh Tran
*Assistant Examiner* — Jason Flohre
(74) *Attorney, Agent, or Firm* — Cowan, Liebowitz & Latman, P.C.

(57) ABSTRACT

An image sensor comprises a pixel array formed by arraying pixels in a column direction and a row direction; a column common readout unit provided for each pixel column in the pixel array; at least three readout channels which sequentially read signals from the column common readout units, respectively; and a readout channel selection unit which selects readout channels so that the signal is output from each of the column common readout units to a corresponding one of the at least three readout channels, wherein the readout channel selection unit selects readout channels, to which the signals are output from the column common readout units, in a predetermined pattern that varies in each individual row of the pixel array.

5 Claims, 11 Drawing Sheets

| a | e | b | f | c | g | d | h | a | e | b | f |
|---|---|---|---|---|---|---|---|---|---|---|---|
| b | f | d | h | a | e | c | g | b | f | d | h |
| d | h | c | g | b | f | a | e | d | h | c | g |
| c | g | a | e | d | h | b | f | c | g | a | e |
| a | e | b | f | c | g | d | h | a | e | b | f |
| b | f | d | h | a | e | c | g | b | f | d | h |
| d | h | c | g | b | f | a | e | d | h | c | g |
| c | g | a | e | d | h | b | f | c | g | a | e |

IMAGE SENSOR AND IMAGE CAPTURE APPARATUS

BACKGROUND OF THE INVENTION

1. Field of the Invention

The present invention relates to an image sensor and an image capture apparatus using the same.

2. Description of the Related Art

As image capture apparatuses such as a digital camera and a digital video camera, image capture apparatuses capable of acquiring a still image and a moving image using image sensors such as a CMOS image sensor are prevailing. Such an image capture apparatus is required to improve the continuous shooting speed of a still image or the frame rate of a moving image, thus making it necessary to speed up signal readout from the image sensor. This image capture apparatus is also required to have a large number of pixels so as to achieve high image quality. Hence, to process a large number of pixel signals within a predetermined period of time, it is again necessary to speed up signal readout from the image sensor.

To meet such a requirement of speedup of signal readout, a multi-channel image sensor including a plurality of readout channels formed by horizontal output circuits and readout amplifiers has come to be generally used. An image capture apparatus which employs a multi-channel image sensor is generally configured to convert pixel signals output from the image sensor into digital data using an A/D converter arranged for each channel, and then rearrange the pixel signals to generate a single image.

However, the offset characteristics, gain characteristics, and linearity characteristics of, for example, the horizontal output circuit, readout amplifier, and A/D converter (analog-to-digital converter) on each channel may vary in each individual channel.

Assume, for example, that signals from an image sensor formed by arraying pixels in an RGB Bayer arrangement are read via a plurality of channels. In this case, when signals of the same color are read to different channels while the individual channels have the above-mentioned variations in characteristics, fixed pattern noise such as vertical streaks/horizontal streaks may be produced in the image. To reduce such fixed pattern noise, a configuration which outputs signals of the same color to the same channel has been proposed.

Japanese Patent Laid-Open No. 2007-174478, for example, proposes the following configuration. That is, signals are output from pixels on odd columns to one of two horizontal output circuits in readout from odd rows, and signals are output from pixels on even columns to this horizontal output circuit in readout from even rows. In contrast to this, signals are output from pixels on even columns to the other horizontal output circuit in readout from odd rows, and signals are output from pixels on odd columns in readout from even rows. Upon this operation, signals of the same color are output to the same channel in the image sensor having the Bayer arrangement, thus reducing fixed pattern noise.

However, to perform readout processing at a higher speed, it is also possible to provide three or more horizontal output circuits and perform multi-channel readout using three or more channels. In this case as well, the above-mentioned configuration in Japanese Patent Laid-Open No. 2007-174478 reads signals of the same color via pluralities of horizontal output circuits, readout amplifiers, and A/D converters. Accordingly, variations in characteristics in each individual channel appear in an output image as fixed pattern noise.

SUMMARY OF THE INVENTION

The present invention has been made in consideration of the above-mentioned problem, and provides an image capture apparatus capable of acquiring an image with high quality by reducing streaked fixed pattern noise, that appears in an output image, even when it uses an image sensor including three or more readout channels.

According to the present invention, there is provided an image sensor comprising: a pixel array formed by arraying pixels in a column direction and a row direction; a column common readout unit provided for each pixel column in the pixel array; at least three readout channels which sequentially read signals from the column common readout units, respectively; and a readout channel selection unit which selects readout channels so that the signal is output from each of the column common readout units to a corresponding one of the at least three readout channels, wherein the readout channel selection unit selects readout channels, to which the signals are output from the column common readout units, in a predetermined pattern that varies in each individual row of the pixel array.

Further features of the present invention will become apparent from the following description of exemplary embodiments with reference to the attached drawings.

DESCRIPTION OF THE EMBODIMENTS

Embodiments of the present invention will be described in detail below with reference to the accompanying drawings.

First Embodiment

Figure 1:
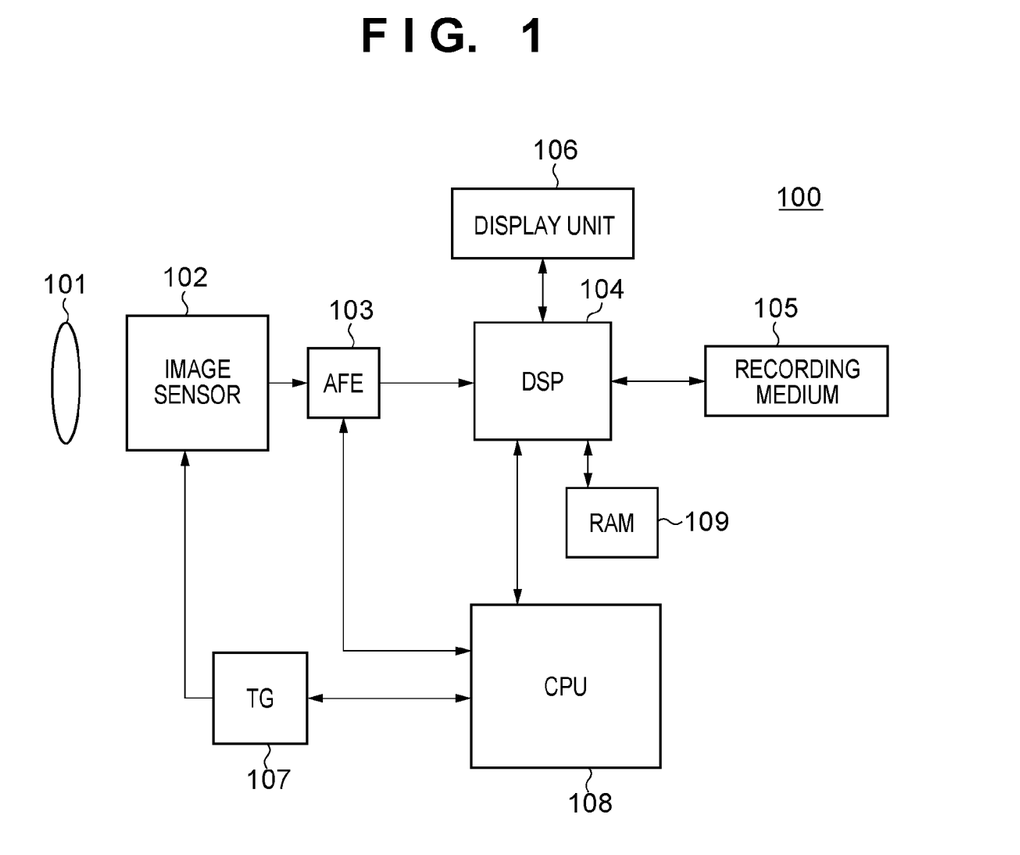
FIG. 1 is a block diagram showing the configuration of an image capture apparatus according to the first embodiment of the present invention.

FIG. 1 is a block diagram showing the configuration of an entire image capture apparatus 100 according to the first embodiment of the present invention. Referring to FIG. 1, an imaging lens 101 forms an image of light from an object, and an image sensor 102 photoelectrically converts the object image formed by the imaging lens 101. A CMOS image sensor, for example, is used as the image sensor 102. An analog image signal output from the image sensor 102 is converted into a digital signal by an AFE 103.

A DSP (Digital Signal Processor) 104 performs, for example, various types of image processing and compression/decompression processing for a digital image signal output from the AFE 103. A recording medium 105 records image data. A display unit 106 displays, for example, a captured image and various menu screens, and uses, for example, a liquid crystal display (LCD). A timing generator (TG) 107 supplies a driving signal to the image sensor 102. A CPU 108 controls the AFE 103, DSP 104, and TG 107. A RAM 109 temporarily stores, for example, image data and is connected to the DSP 104.

Figure 2:
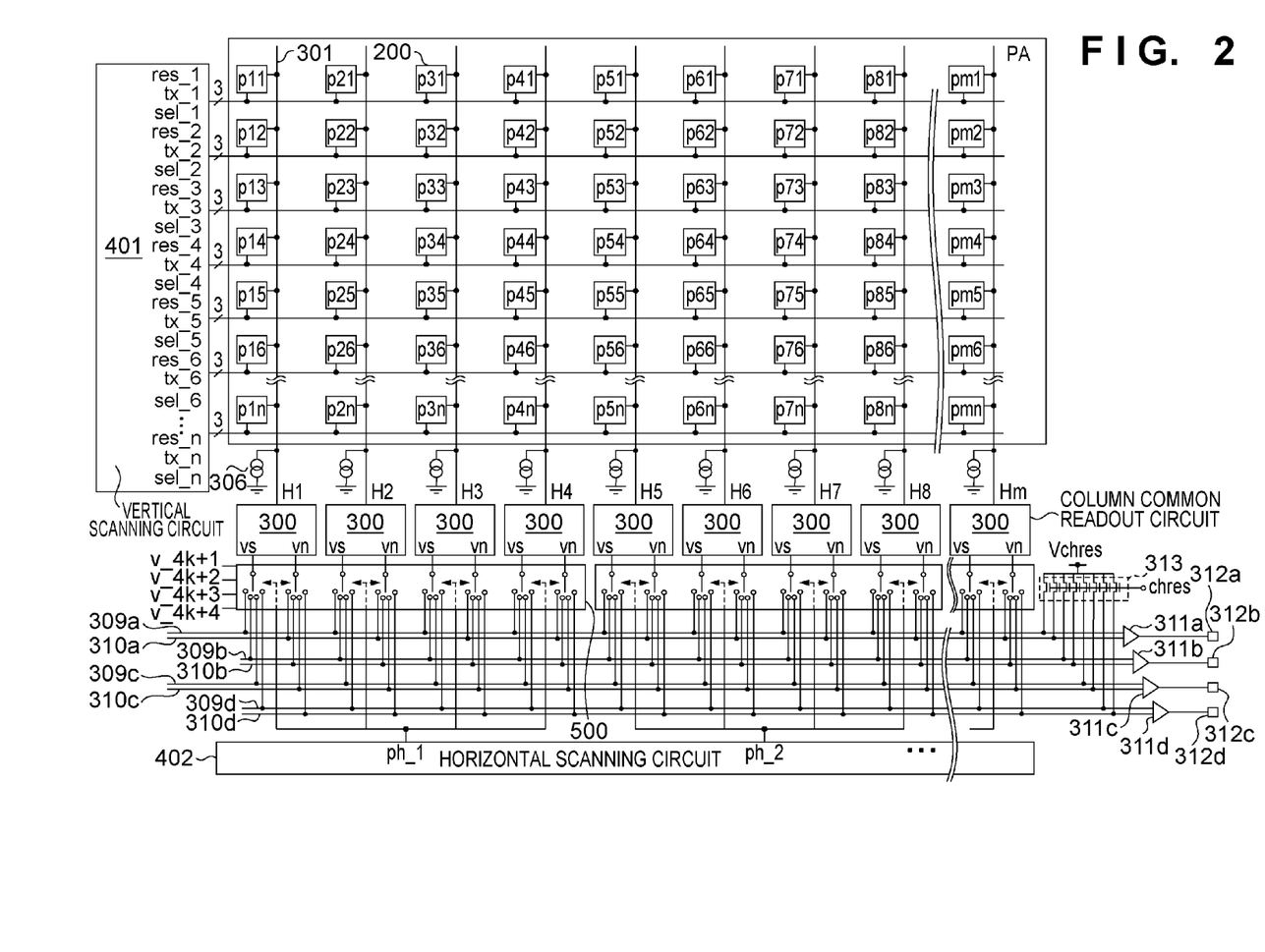
FIG. 2 is a circuit diagram showing the configuration of an entire image sensor.

The configuration of the image sensor 102 will be described next with reference to FIGS. 2 to 5. FIG. 2 is a circuit diagram showing the configuration of the entire image sensor 102. Pixels 200 are arranged in a pixel area PA in a matrix in the row and column directions from pixel p11 to pixel pmn. The configuration of each pixel 200 will be described herein with reference to FIG. 3.

Figure 3:
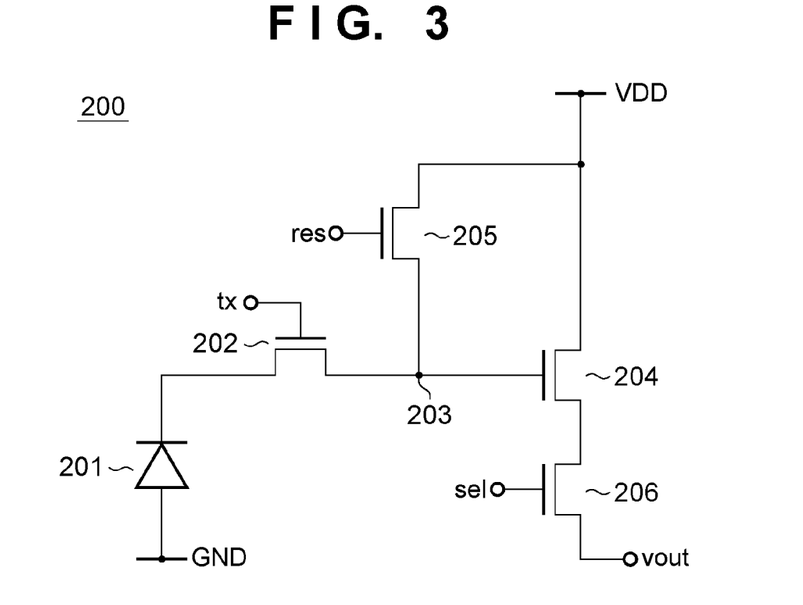
FIG. 3 is a circuit diagram showing the configuration of one pixel of the image sensor.

A photodiode (to be abbreviated as a PD hereinafter) 201 photoelectrically converts an incident optical signal and stores charges corresponding to the exposure amount. A transfer gate 202 changes a signal tx to high level to transfer the charges stored in the PD 201 to an FD (floating diffusion) portion 203. The FD portion 203 is connected to the gate of a floating diffusion amplifier (to be abbreviated as an FD amplifier hereinafter) 204 and converts the amount of charges transferred from the PD 201 into a voltage.

An FD reset switch 205 serves to reset the FD portion 203 and changes a signal res to high level to reset the FD portion 203. Also, to reset the charges in the PD 201, the signals tx and res are simultaneously changed to high level to turn on both the transfer gate 202 and FD reset switch 205 so that the PD 201 is reset via the FD portion 203. A pixel selection switch 206 changes a signal sel to high level to output a pixel signal converted into a voltage by the FD amplifier 204 to an output vout of the pixel 200.

Referring back to FIG. 2, a vertical scanning circuit 401 supplies driving signals such as signals rest, tx1, and sel1 to each pixel 200. The output vout of each pixel 200 is connected to a column common readout circuit 300 via a vertical output line 301 for each column.

Figure 4:
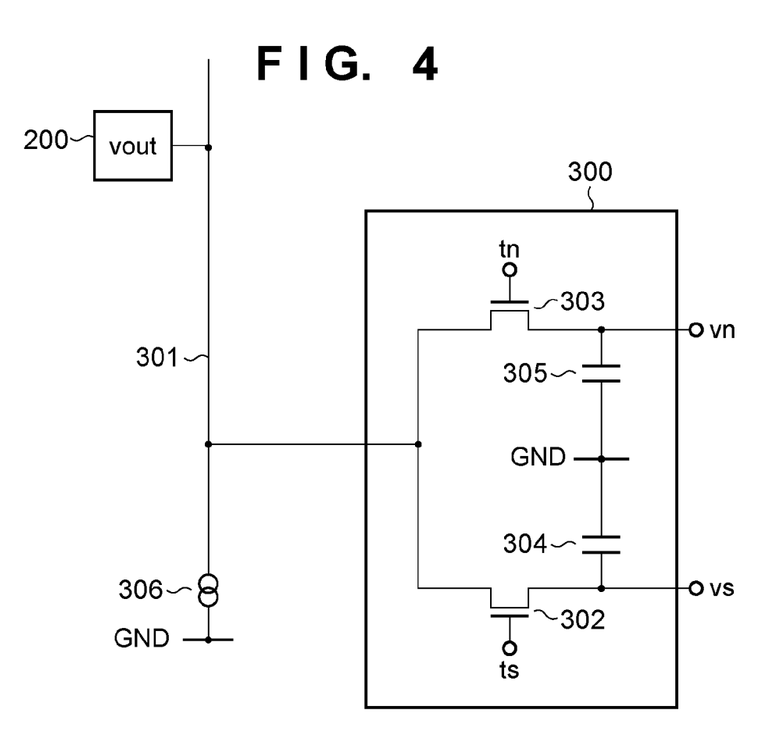
FIG. 4 is a circuit diagram showing the configuration of a column common readout circuit.

The configuration of the column common readout circuit 300 will be described herein with reference to FIG. 4. The vertical output line 301 is provided for each column and connected to the outputs vout of all the pixels 200 corresponding to one column. A current source 306 is connected to the vertical output line 301, and forms a source follower circuit together with the FD amplifier 204 of the pixel 200 connected to the vertical output line 301.

An S signal transfer switch 302 serves to transfer a pixel signal S read from the pixel 200 to a holding capacitor 304. The S signal transfer switch 302 changes a signal ts to high level to hold the pixel signal S from the vertical output line 301 in the holding capacitor 304 via the S signal transfer switch 302. An N signal transfer switch 303 serves to transfer a noise signal N read from the pixel 200 to a holding capacitor 305. The N signal transfer switch 303 changes a signal tn to high level to hold the noise signal N from the vertical output line 301 in the holding capacitor 305 via the N signal transfer switch 303.

The column common readout circuit 300 is formed by the above-mentioned S signal transfer switch 302, N signal transfer switch 303, S signal holding capacitor 304, and N signal holding capacitor 305, and has an output vs to which the pixel signal S is output, and an output vn to which the noise signal N is output.

Referring back to FIG. 2, an output channel selection circuit 500 is formed by switches which switch the pair of horizontal output lines, to which the outputs vs and vn of the column common readout circuit 300 are transferred, between pairs of horizontal output lines 309a to 309d and 310a to 310d (pairs of output lines, which are equal in number to three or more channels). Signals from columns selected in accordance with column selection signals ph_1, ph_2, . . . output from a horizontal scanning circuit 402 are sequentially output to the horizontal output lines selected by the output channel selection circuit 500.

The horizontal output lines 309a to 309d and 310a to 310d are connected to the inputs of differential amplifiers 311a to 311d, respectively, and obtain the differences between the pixel signals S and the noise signals N and multiply them by predetermined gains at the same time. The signals amplified by the differential amplifiers 311a to 311d are output from output terminals 312a to 312d, respectively, to the outside of the image sensor 102.

A readout channel formed by the horizontal output lines 309a and 310a, differential amplifier 311a, and output terminal 312a will be referred to as channel a hereinafter for the sake of descriptive simplicity. Similarly, a readout channel formed by the horizontal output line 309b/horizontal output line 310b/differential amplifier 311b/output terminal 312b will be referred to as channel b hereinafter, that formed by the horizontal output line 309c/horizontal output line 310c/differential amplifier 311c/output terminal 312c will be referred to as channel c hereinafter, and that formed by the horizontal output line 309d/horizontal output line 310d/differential amplifier 311d/output terminal 312d will be referred to as channel d hereinafter.

Note that horizontal output line reset switches 313 are turned on when a signal chres changes to high level. At this time, the horizontal output lines 309a to 309d and 310a to 310d are reset to a reset voltage Vchres.

Figure 5:
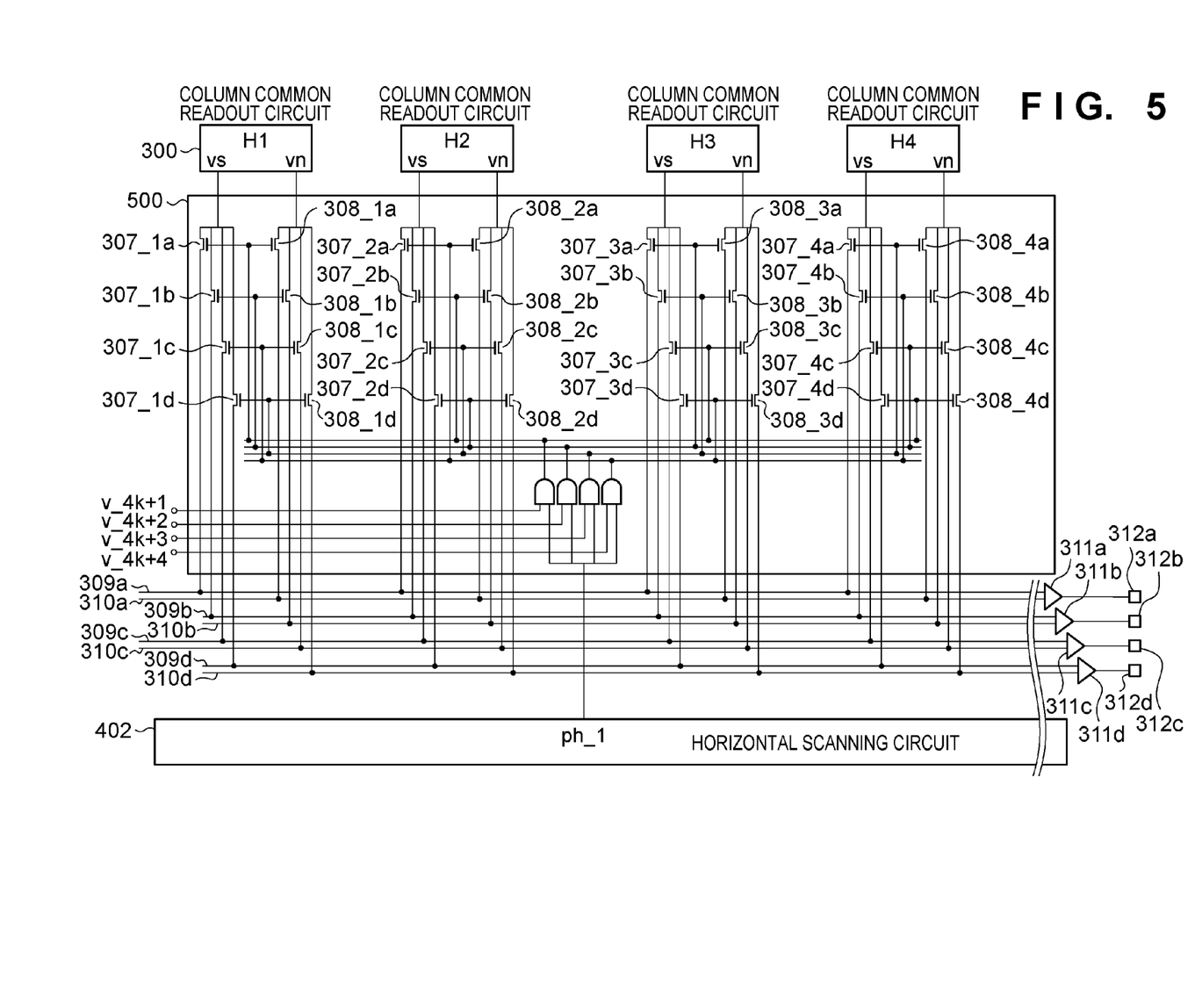
FIG. 5 is a circuit diagram showing the configuration of an output channel selection circuit.

FIG. 5 is a circuit diagram showing the detailed configuration of the output channel selection circuit 500, which is connected to its peripheral blocks. FIG. 5 shows column common readout circuits 300 corresponding to four columns H1 to H4 for the sake of convenience. When the control signal ph_1 output from the horizontal scanning circuit 402 changes to high level, horizontal transfer switches corresponding to the readout row are turned on so that the outputs vs and vn of the column common readout circuits 300 on columns H1 to H4 are transferred to corresponding horizontal output lines.

When the (4k+1)th row (k=0, 1, 2, . . . ), for example, is selected, a signal v_4k+1 indicating the readout row changes to high level so that the column selection signal ph_1 is sent from the horizontal scanning circuit 402 to horizontal transfer switches 307_1a, 308_1a, 307_2b, 308_2b, 307_3c, 308_3c, 307_4d, and 308_4d. Upon this operation, signals are transferred from column H1 to channel a, signals are transferred from column H2 to channel b, signals are transferred from column H3 to channel c, and signals are transferred from column H4 to channel d.

Figure 6:
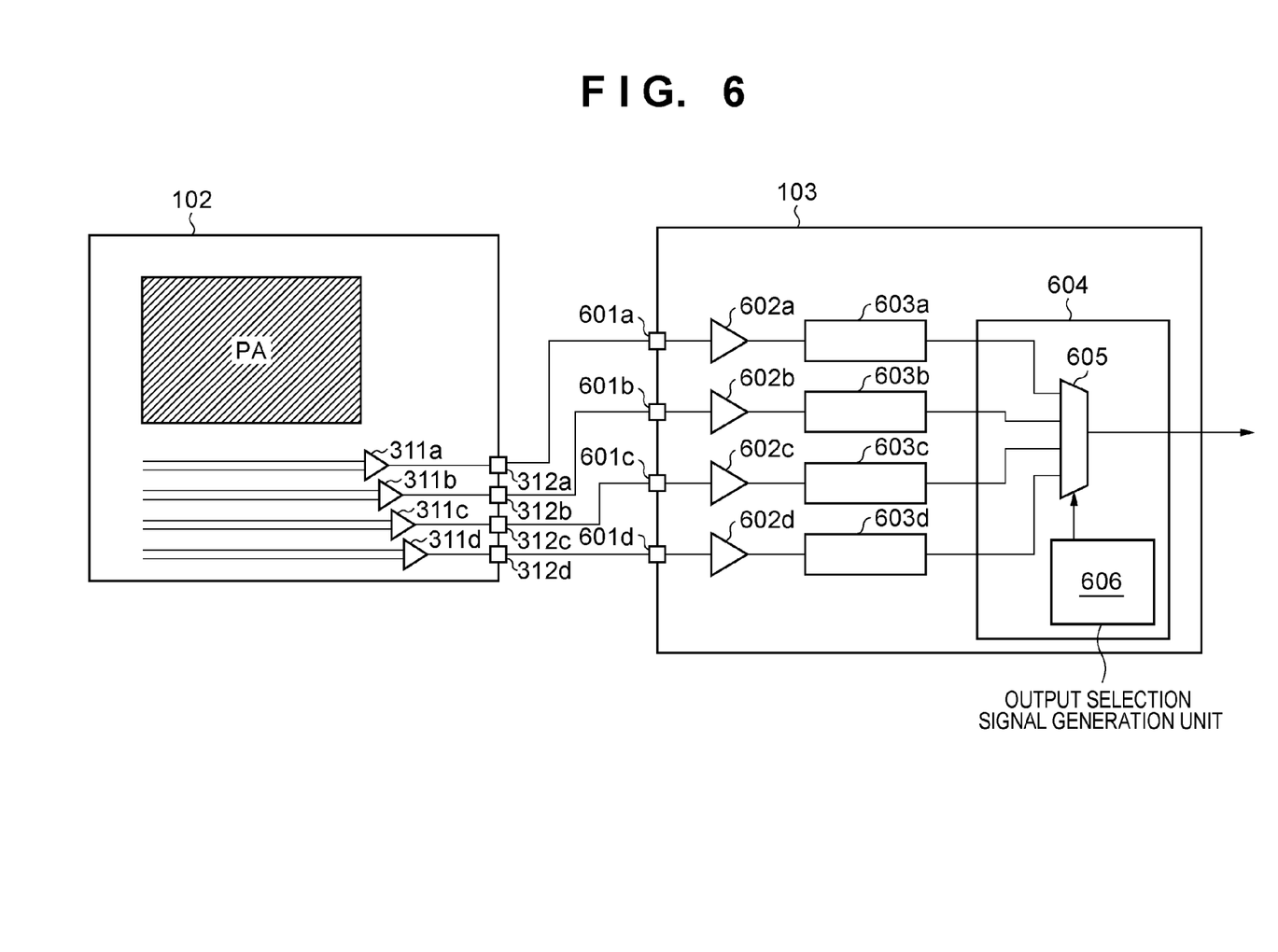
FIG. 6 is a block diagram showing the configuration of an AFE, and members via which the AFE and the image sensor are connected to each other.

FIG. 6 is a block diagram showing the configuration of the AFE 103, and members via which the image sensor 102 and the AFE 103 are connected to each other. The output terminals 312a to 312d of the image sensor 102 are connected to input terminals 601a to 601d, respectively, of the AFE 103. Signals input to the input terminals 601a to 601d are multiplied by predetermined gains by amplifiers 602a to 602d, respectively, and converted from analog signals into digital signals by A/D converters 603a to 603d, respectively. Channel-specific pixel data (digital data) obtained by converting analog signals into digital signals by the A/D converters 603a to 603d are rearranged in a sequence corresponding to the pixel array by an output sequence control unit 604, and output from the AFE 103 to the DSP 104 in the subsequent stage. The output sequence control unit 604 includes a multiplexer 605 which switches and selects a signal from each channel as a signal output from the AFE 103, and an output selection signal generation unit 606 which generates a control signal according to which the multiplexer 605 is controlled.

Figure 7:
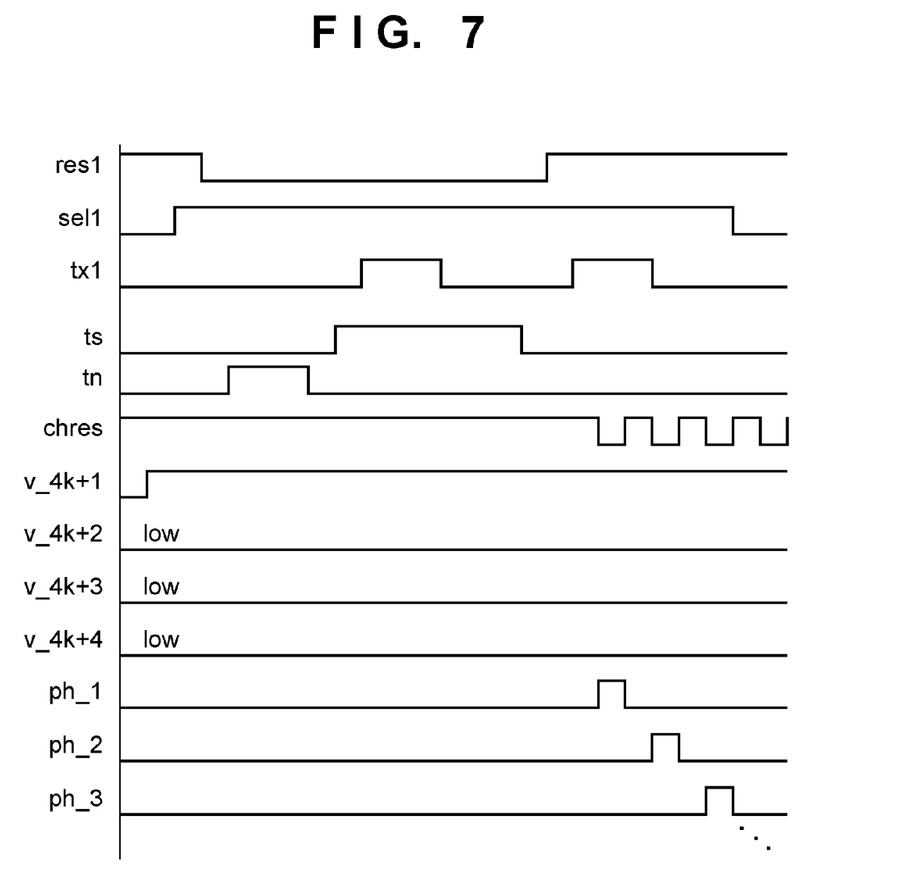
FIG. 7 is a timing chart showing a readout operation on each row.

The operation of the image sensor 102 will be described next with reference to a timing chart shown in FIG. 7. FIG. 7 shows a readout operation on the first row. Numbers suffixed to reference symbols res, sel, and tx correspond to those of pixel rows from which signals are to be read.

First, the signal v_4k+1 indicating readout from the first row is changed to high level, and a signal sel_1 is also changed to high level to turn on the pixel selection switch 206 on the first row. A signal res_1 is changed to low level to turn off the FD reset switch 205 so that reset of the FD portion 203 is canceled.

The signal tn is turned on so that an N signal is stored in the N signal holding capacitor 305 via the N signal transfer switch 303. The signal tn is then changed to low level to turn off the N signal transfer switch 303, the signal ts is changed to high level to turn on the S signal transfer switch 302, and a signal tx_1 is changed to high level to turn on the transfer gate 202. Upon this operation, the signal accumulated in the PD 201 on the selected row is output to vertical output line 301 via the FD amplifier 204 and pixel selection switch 206, and stored in the S signal holding capacitor 304 via the S signal transfer switch 302.

The signals tx_1 and ts are changed to low level to turn off the transfer gate 202 and S signal transfer switch 302, and the signal res_1 is changed to high level to turn on the FD reset switch 205 so that the FD portion 203 is reset. Selection signals ph_1, ph_2, . . . from the respective columns, which are controlled by the horizontal scanning circuit 402, are sequentially changed to high level. When the selection signal ph_1 changes to high level, signals in the S signal holding capacitor 304 and N signal holding capacitor 305 on column H1 are transferred to the horizontal output lines 309a and 310a and output to the output terminal 312a via the differential amplifier 311a, as described above. At the same time, signals are output from columns H2 to H4 to the output terminals 312b to 312d via the horizontal output lines and differential amplifiers on channels b to d, respectively.

The column selection signal ph_1 is returned to low level, and a signal chres is changed to high level at the same time to turn on the horizontal output line reset switches 313 so that the horizontal output lines 309a to 309d and 310a to 310d are temporarily reset to the level of the reset voltage Vchres. When the column selection signal ph_2 changes to high level, signals are output from column H5 to channel a, signals are output from column H6 to channel b, signals are output from column H7 to channel c, and signals are output from column H8 to channel d. Subsequently, column-specific signal readout operations and horizontal output line reset operations are continued until all signals corresponding to the m columns are read from the first row.

In the signal readout period for the first row, the output selection signal generation unit 606 of the AFE 103 generates a selection signal so that data are output from the output sequence control unit 604 via the channels in the sequence of channel a→channel b→channel c→channel d.

Figure 8A:
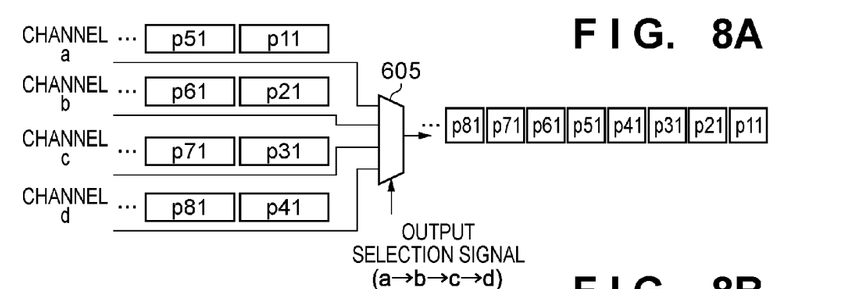
FIGS. 8A to 8D are block diagrams showing signals rearranged by an output sequence control unit.

FIG. 8A shows signals rearranged by the output sequence control unit 604. Pixel signals read from different channels are rearranged in the sequence of the pixel array of the image sensor 102 in accordance with an output selection signal controlled in the sequence of a→b→c→d.

Figure 9:
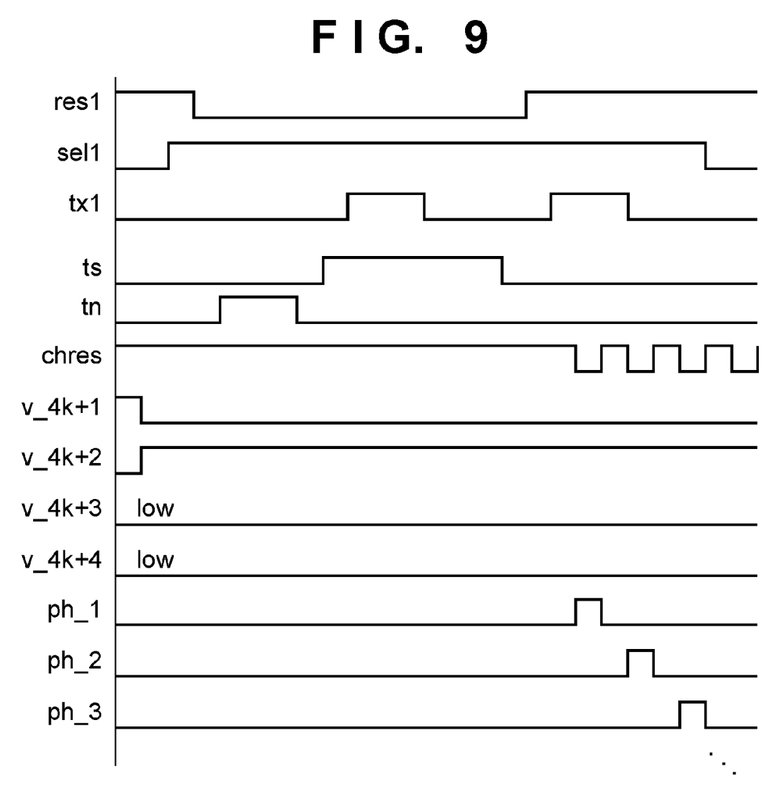
FIG. 9 is a timing chart showing a readout operation on each row.

FIG. 9 shows a readout operation on the second row. After signal are read from the first row, the signal v_4k+1 is returned to low level, and a signal v_4k+2 indicating readout from the second row is changed to high level at the same time. Other signal control operations are the same as in the readout operation on the first row, shown in FIG. 7.

The signal v_4k+2 is at high level, so when the signal ph_1 changes to high level, signals are output from column H1 to channel b, signals are output from column H2 to channel d, signals are output from column H3 to channel a, and signals are output from column H4 to channel c. As in the first row, the horizontal output lines are reset in accordance with the signal chres to read signals from columns H5 to H8. Subsequently, column signal readout operations and horizontal output line reset operations are continued until all signals corresponding to the m columns are read from the second row.

Figure 8B:
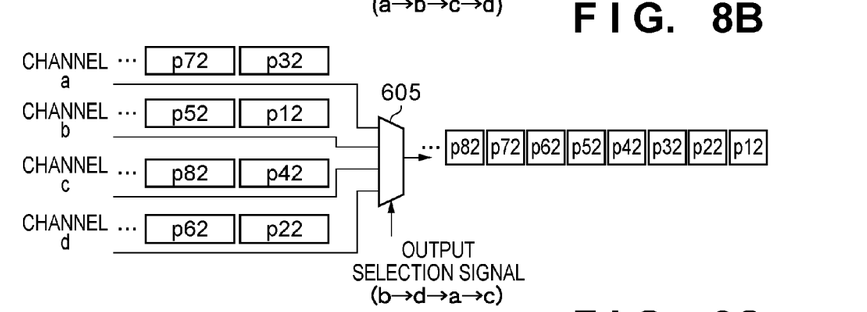

In the signal readout period for the second row, the output selection signal generation unit 606 of the AFE 103 generates a selection signal so that data are output from the output sequence control unit 604 via the channels in the sequence of channel b→channel d→channel a→channel c. Pixel signals are rearranged in the sequence of the pixel array of the image sensor 102, as shown in FIG. 8B.

Approximately the same applies to the third and fourth rows, and details thereof are shown, but timing charts of the third and fourth rows are different from FIGS. 8A to 8D or 9 only in the type of signal indicating the readout row. In the signal readout period for the third row, a signal v_4k+3 changes to high level, while the remaining signals change to low level. In the signal readout period for the fourth row, a signal v_4k+4 changes to high level, while the remaining signals change to low level.

Figure 8C:
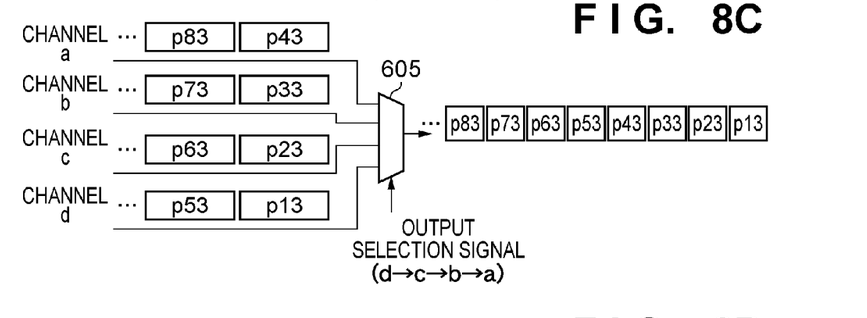
Figure 8D:
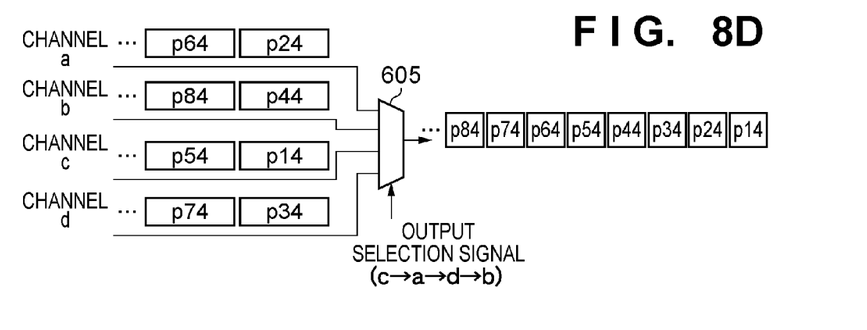

Also, the output sequence control unit 604 of the AFE 103 rearranges pixel signals using a method shown in FIG. 8C in the signal readout period for the third row, and rearranges pixel signals using a method shown in FIG. 8D in the signal readout period for the fourth row. In both cases, the output sequence control unit 604 outputs pixel signals in the sequence of the pixel array of the image sensor 102.

Subsequently, the same readout operation as in those on the first to fourth rows is repeated until signals are read from the last row, that is, the nth row, thereby completing signal readout from all the pixels on the image sensor 102.

Figure 10:
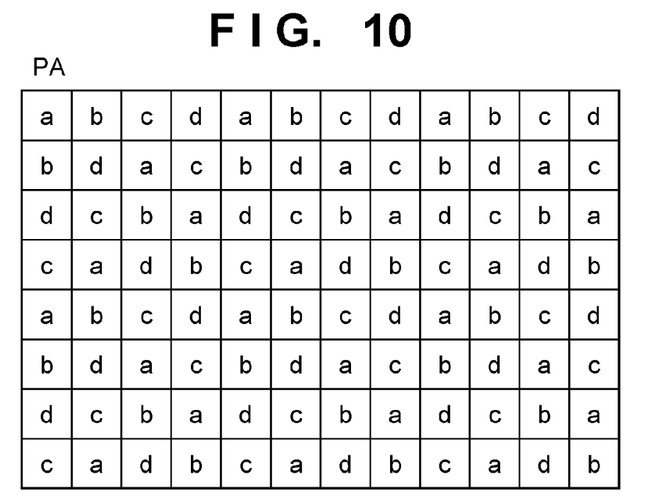
FIG. 10 is a view schematically showing the pixel array of the image sensor.

FIG. 10 is a view schematically showing the pixel area PA of the image sensor 102. FIG. 10 shows an array of 12×8 pixels. Alphabetical letters a to d in the respective pixels indicate channels used in readout from these pixels.

In this manner, readout channels are two-dimensionally provided in correspondence with a two-dimensional pixel array to generate an image with less streaked fixed pattern noise even if the offset characteristics/gain characteristics/linearity characteristics, for example, vary in each individual readout channel.

The above-mentioned variations in characteristics in each individual channel may occur in the respective units which constitute the readout channels, such as the horizontal output lines/readout amplifiers/A/D converters, due to the difference in property of power supply lines, that in impedance of each signal line, and that in reference voltage or reference current.

With the above-mentioned configuration, an image with high quality can be obtained by reducing streaked fixed pattern noise in an image obtained by reading pixel signals from the image sensor 102.

Although a configuration which switches the correspondence between the column common readout circuits and the horizontal output lines in accordance with the readout row has been described in this embodiment, the present invention is not limited to this, and other configurations may be employed as long as they switch the correspondence between the readout circuit and the A/D converter for each pixel column in accordance with the readout row. When, for example, a configuration including A/D converters corresponding to columns, such as column A/D converters, is adopted, it may switch, for each row, the connection relationship between the readout circuit and the A/D converter on each column. These configurations can reduce streaked fixed pattern noise due to variations in characteristics in each individual A/D converter, as in the configuration described in this embodiment.

Also, a configuration which reads all signals corresponding to the m columns in the horizontal direction has been described. However, when the horizontal scanning circuit 402 performs thinning scanning in a given shooting mode, an output selection switch may be configured so that the correspondence pattern between pixels in a thinned image and output channels is the same as in readout from all the pixels.

Moreover, in this embodiment, the correspondence between the pixel columns and the readout channels in readout from each row is determined as the repetition pattern of a cycle of four columns (a cycle of columns equal in number to readout channels). However, the present invention is not limited to this, and a pattern in which a given correspondence between the pixel columns and the readout channels in readout from each row is repeated in a cycle of columns in a number equal to or larger than that of readout channels may be adopted.

Second Embodiment

In the above-mentioned first embodiment, a configuration in which large numbers of horizontal transfer switches 307 and 308 of the output channel selection circuit 500 are connected to the horizontal output lines is used, as shown in FIG. 5. Hence, the drain capacitances of transistors equal in number to switches connected to the horizontal output lines are added to these horizontal output lines as parasitic capacitances. As the parasitic capacitances of the horizontal output lines increase, the change in potential upon distribution of charges from the S signal holding capacitor 304 and N signal holding capacitor 305 in transferring signals from the column common readout circuit 300 reduces, so the signal amplitude also reduces. To solve this problem, a method of obtaining an image with less streaked fixed pattern noise while reducing the parasitic capacitances of the horizontal output lines will be described in this embodiment.

Figure 11:
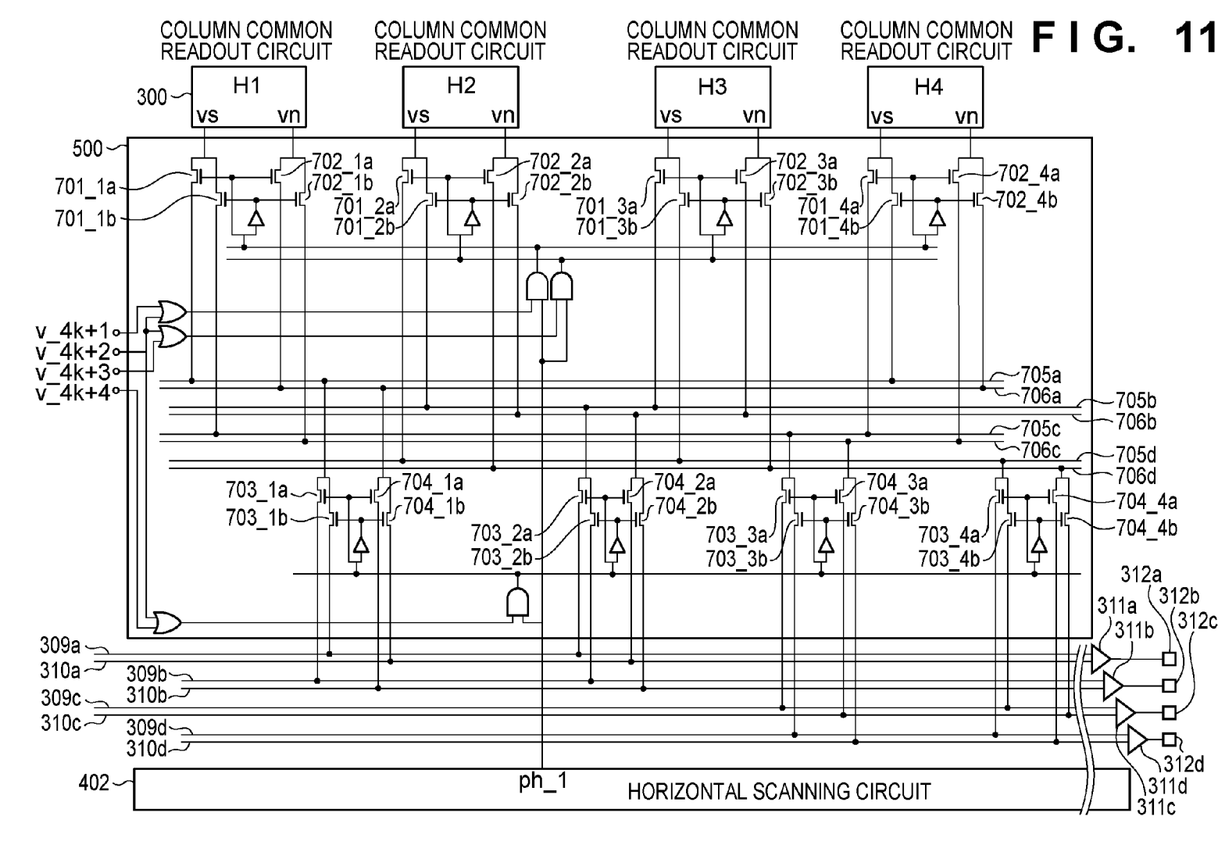
FIG. 11 is a circuit diagram showing the configuration of an output channel selection circuit in the second embodiment of the present invention.

The second embodiment is different from the first embodiment in configuration of an output channel selection circuit 500. FIG. 11 shows the configuration of the output channel selection circuit 500 in the second embodiment. In this configuration, signals are transferred from column common readout circuits 300 to horizontal output lines 309a to 309d and 310a to 310d via a plurality of block signal lines 705a to 705d and 706a to 706d arranged for every predetermined number of columns.

The block signal lines 705a to 705d and 706a to 706d are provided in the output channel selection circuit 500 across every predetermined number of columns defined as every pattern cycle (every four columns in this configuration) in which the output channels are switched. Block signal line selection switches 701_1a/701_1b to 701_4a/701_4b and 702_1a/702_1b to 702_4a/702_4b serve as signal transfer switches (first transfer switches) which transfer signals from the column common readout circuits 300 of the respective columns to the block signal lines. Also, horizontal output line selection switches 703_1a/703_1b to 703_4a/703_4b serve as signal transfer switches (second transfer switches) which transfer signals from the block signal lines to the horizontal output lines.

A timing chart of each control signal is the same as in the first embodiment (FIGS. 7 and 9). When a horizontal scanning circuit 402 changes a column selection signal ph_1 to high level, block signal line selection switches corresponding to the states of signals v_4k+1 to v_4k+4 indicating the readout rows are turned on so that signals are transferred from columns H1 to H4 to the corresponding block signal lines. At the same time, the horizontal output line selection switches corresponding to the readout rows are also turned on so that the signals transferred to the block signal line selection switches are sent to the selected corresponding horizontal output lines.

In readout from, for example, the first row, the block signal line selection switches 701_1a, 702_1a, 701_2b, 702_2b, 701_3b, 702_3b, 701_4a, and 702_4a are turned on. The horizontal output line selection switches 703_1b, 704_1b, 703_2b, 704_2b, 703_3b, 704_3b, 703_4b, and 704_4b are turned on. Upon this operation, signals are transferred from column H1 to the horizontal output lines 309a/310a (channel a) via the block signal lines 705a/706a. Signals are transferred from column H2 to the horizontal output lines 309b/310b (channel b) via the block signal lines 705b/706b. Signals are transferred from column H3 to the horizontal output lines 309c/310c (channel c) via the block signal lines 705c/706c. Signals are transferred from column H4 to the horizontal output lines 309d/310d (channel d) via the block signal lines 705d/706d.

Subsequently, the same operation is repeated in the horizontal direction to transfer all signals corresponding to the m columns on the first row. As for readout from the second and subsequent rows, the block signal line selection switches and horizontal output line selection switches corresponding to the readout rows are turned on so that signals are read in accordance with the correspondence between the pixel columns and the readout channels, which is similar to that shown in FIG. 10.

According to this embodiment, it is possible to reduce the number of switches to be directly connected to the horizontal output lines 309a to 309d and 310a to 310d while obtaining the same effect as in the first embodiment for streaked pattern noise, thus reducing their parasitic capacitances.

Third Embodiment

Figure 12:
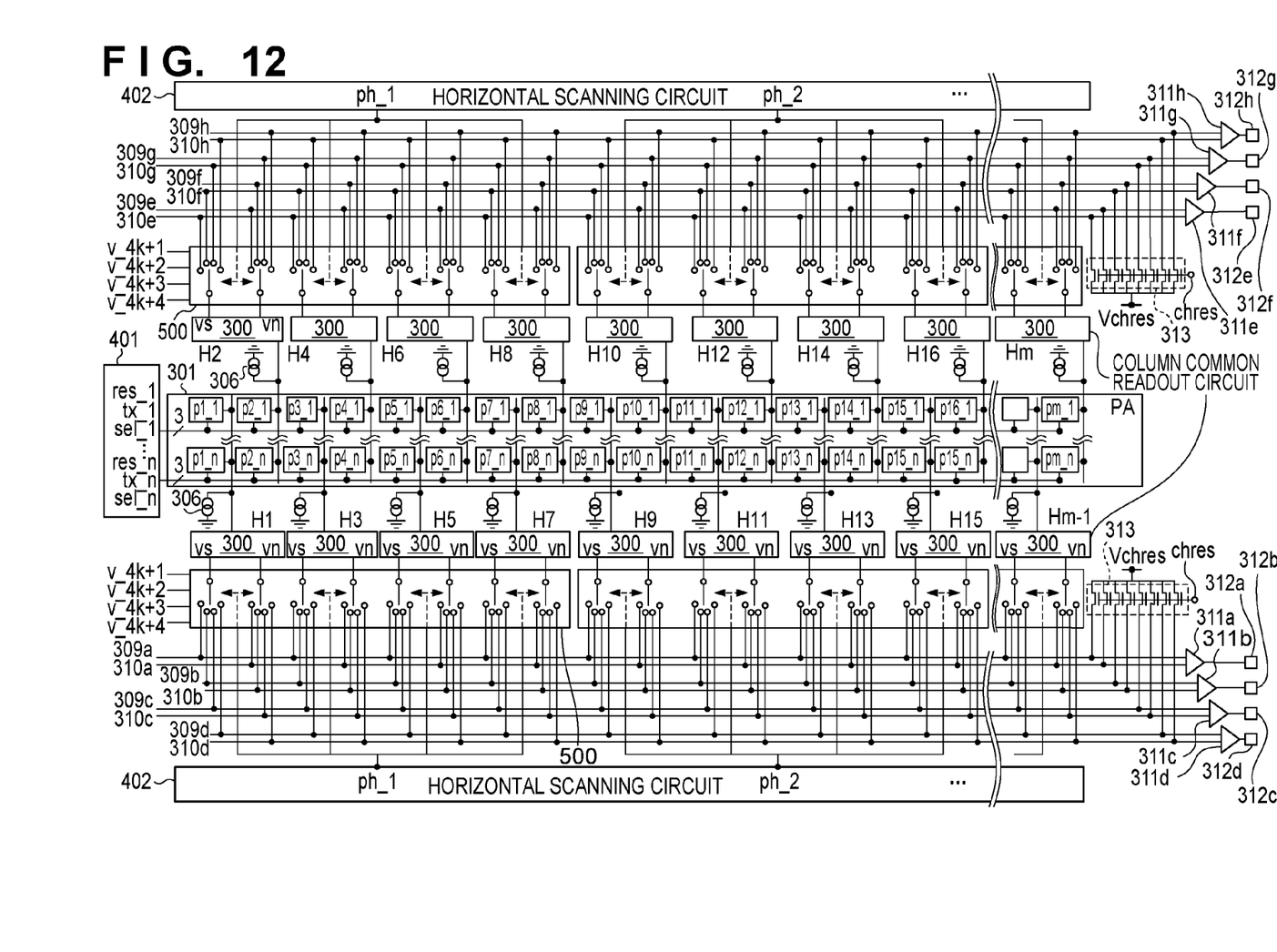
FIG. 12 is a circuit diagram showing the configuration of an entire image sensor in the third embodiment of the present invention.

The case wherein readout circuits such as column common readout circuits and horizontal output lines are present on one side, that is, the lower side in the pixel area PA has been taken as an example in the above-mentioned first and second embodiments. However, as the number of readout channels increases, it is more often the case that readout circuits are arranged on both the upper and lower sides (in the upper and lower portions) of the pixel area PA to ensure a given readout circuit area on each column. FIG. 12 shows an embodiment in which such an image sensor is used.

Signals are read from odd columns to lower column common readout circuits 300 of a pixel area PA, and signals are read from even columns to upper column common readout circuits 300 of the pixel area PA. Channels a to d are arranged on the lower side, and channels e to h are arranged on the upper side. In such a case, to switch the output channels between the lower channels a to d and the upper channels e to f, it is necessary to form signal lines across the pixel area PA. This is impractical in terms of the impedance of each signal line.

Hence, this embodiment employs a configuration which switches the output channel for each row between odd column readout channels a to d to output pixel signals from odd columns, and switches the output channel for each row between even column readout channels e to h to output pixel signals from even columns, like the configuration shown in FIG. 12. Odd column readout circuits on the lower side of the pixel area PA and even column readout circuits on the upper side of the pixel area PA perform the same operations as described in the first or second embodiment.

Figure 13:
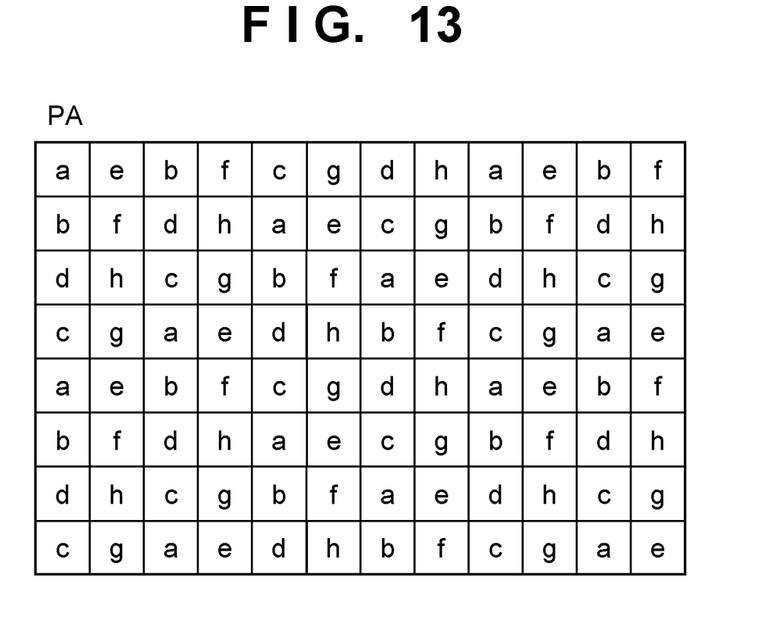
FIG. 13 is a view schematically showing the pixel array of the image sensor in the third embodiment.

FIG. 13 is a view schematically showing the pixel area PA of the image sensor 102 in this embodiment. FIG. 13 shows an array of 16×10 pixels. Alphabetical letters a to f in the respective pixels indicate channels used in readout from these pixels, as in FIG. 10. Both the odd column readout circuits and the even column readout circuits have exactly the same configuration, and therefore select output channels in the same pattern. For this reason, although pixels from which signals are read are adjacent on channels a/e, b/f, c/g, and d/h, but streaked fixed pattern noise can be reduced, as in the first and second embodiments. As a matter of course, the odd column readout circuits and the even column readout circuits may select output channels in different patterns, unlike this embodiment.

With the above-mentioned configuration, even when readout circuits are separately arranged on the upper and lower sides of the pixel area, it is possible to switch the correspondence between the pixel columns and the readout channels in accordance with the readout row, and prevent an increase in impedance of each signal line.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-095276 filed Apr. 21, 2011, which is hereby incorporated by reference herein in its entirety.

What is claimed is:

1. An image sensor comprising:
a pixel array formed by arraying pixels in a column direction and a row direction;
a column common readout unit provided for each pixel column in the pixel array;
at least three readout channels which sequentially read signals from said column common readout units, respectively; and
a readout channel selection unit which selects readout channels so that the signal is output from each of said column common readout units to a corresponding one of said at least three readout channels,
wherein said readout channel selection unit includes a plurality of block signal lines provided for every predetermined number of columns of said pixel array, a plurality of first transfer switches which transfer the signals from said column common readout units to said block signal lines, and a plurality of second transfer switches which transfer the signals from said block signal lines to said readout channels, and controls said first transfer switches and said second transfer switches to select readout channels, to which the signals are output from said column common readout units, in a predetermined pattern that varies in each individual row of said pixel array.

2. The sensor according to claim 1, wherein a repetition cycle of the predetermined pattern uses columns larger in number than readout channels.

3. An image sensor comprising:
a pixel array formed by arraying pixels in a column direction and a row direction;
a column common readout unit provided for each pixel column in the pixel array;
at least three readout channels which are separately arranged in each of an upper portion and a lower portion of said pixel array and sequentially read signals from said column common readout units, respectively; and
readout channel selection units which are separately arranged in each of the upper portion and the lower portion of said pixel array and selects readout channels so that the signal is output from each of said column common readout units to a corresponding one of said at least three readout channels,
wherein said readout channel selection units select readout channels, to which the signals are output from said column common readout units, in a predetermined pattern that varies in each individual row of said pixel array and the predetermined pattern is different between the readout channel selection unit of the upper portion and the readout channel selection unit of the lower portion.

4. An image capture apparatus comprising:
an image sensor defined in claim 1;
an A/D converter corresponding to each of the readout channels; and
an output sequence control unit which rearranges pixel data, obtained by converting analog data into digital data by said A/D converter, in accordance with the predetermined pattern.

5. An image capture apparatus comprising:
an image sensor defined in claim 3;
an A/D converter corresponding to each of the readout channels; and
an output sequence control unit which rearranges pixel data, obtained by converting analog data into digital data by said A/D converter, in accordance with the predetermined pattern.

* * * * *